(No Model.)
J. Z. BENSON & A. BLANCHARD.
IMPLEMENT FOR DEHORNING CATTLE.
No. 410,345. Patented Sept. 3, 1889.
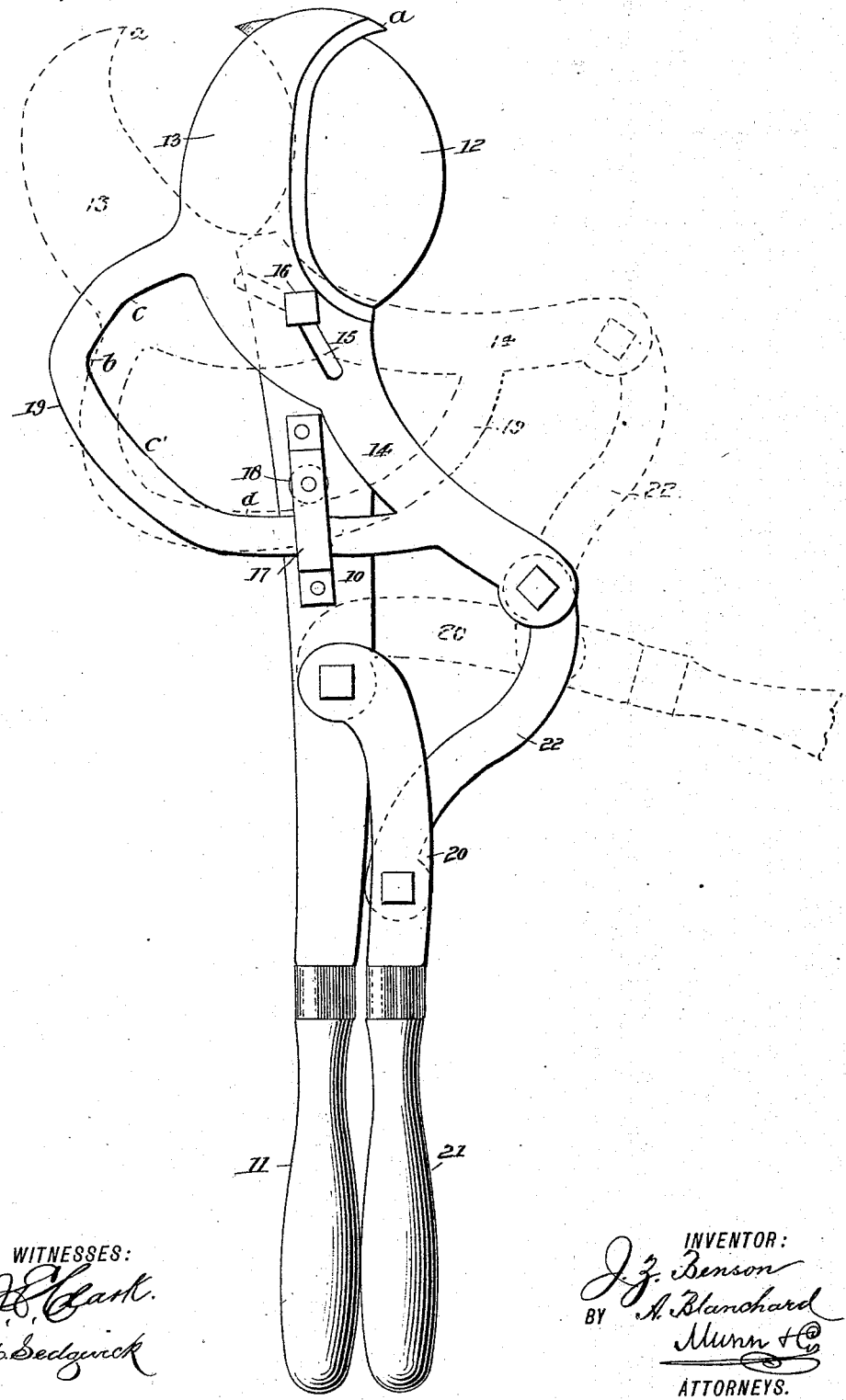

UNITED STATES PATENT OFFICE.

JOHN Z. BENSON AND ALBERT BLANCHARD, OF ROLFE, IOWA.

IMPLEMENT FOR DEHORNING CATTLE.

SPECIFICATION forming part of Letters Patent No. 410,345, dated September 3, 1889.

Application filed February 12, 1889. Serial No. 299,619. (No model.)

*To all whom it may concern:*

Be it known that we, JOHN Z. BENSON and ALBERT BLANCHARD, both of Rolfe, in the county of Pocahontas and State of Iowa, have invented a new and useful Implement for Dehorning Cattle, of which the following is a full, clear, and exact description.

Our invention relates to an improvement in implements for dehorning cattle, and has for its object to provide a simple and durable device capable of cutting the entire circumference of the horn, thereby sustaining the strength of the horn until completely severed and effectually preventing one side from splitting down in the head, as frequently happens when the old form of dehorning implement is employed.

The invention consists in the novel construction and combination of the several parts, as will be hereinafter fully set forth, and pointed out in the claims.

Reference is to be had to the accompanying drawing, forming a part of this specification, in which the figure represents the implement as closed in positive lines and as open in dotted lines.

In carrying out the invention the body 10 of the implement, which consists of an essentially-straight bar, preferably rectangular in cross-section, is provided at the lower extremity with a rigidly-secured handle 11, and at the opposite end with an integral blade 12, extending outward therefrom in the same vertical plane, the longitudinal axis of the blade, however, being out of alignment with the similar axis of the body. The blade 12 is provided upon one inner edge with a circular cutting-edge, as shown in dotted lines. A second blade 13, provided with an integral curved arm 14 at one end, is pivoted upon the body 10 below the blade 12, preferably about two and five-eighths inches from the center surface of the body-blade when the corresponding surface of the pivoted blade is, for instance, about four inches from point to point. The pivotal connection of the two blades is effected by producing a longitudinal slot 15 in the movable blade near its union with the curved arm 14 and passing a headed bolt 16 through the said slot into the body at the point above mentioned. The cutting-surface of the movable or shearing blade is beveled in reverse direction to the corresponding surface of the fixed blade, and the circle of the cutting-surface of the shearing-blade is of greater radius than that of the fixed blade and is quickened at the point, as best shown at *a*. Upon the body 10, below the pivotal point of the shearing-blade 12, a keeper 17 is longitudinally secured, and between the opposed faces of the keeper and the body 10, near the upper end of the former, a friction-roller 18 is journaled. A guide-arm 19, which is attached to or is integral with the outer or under surface of the shearing-blade and arm, is passed beneath the keeper and adapted at a given point in its travel for contact with the friction-roller 18. The curved guide-arm 19 is made straight from a point *b* to points *c c'* and circular from the point *c'* to the point *d*, from which latter point to the connection of the guide-arm with the arm 14 of the shearing-blade the circle is of greater radius. A lever 20 is pivoted at one end upon the body 10 below the keeper 17, which lever is provided with an attached handle 21, the length of the handle of the lever being preferably so calculated that when the lever is brought down parallel with the body 10 the extremities of the handles 11 and 21 will be virtually in horizontal alignment, as shown in positive lines in the figure. The lever 20 is pivotally connected with the extremity of the blade-arm 14 by means of a link 22.

In operation, when the blades are carried apart, as illustrated in dotted lines in the figure, to grasp the horn to be severed as the lever-handle 21 is carried downward a slight distance, the circular surface of the guide-arm 19 is brought in contact with the friction-roller 18, and the shearing-blade in closing moves in a radial line, as upon a pivot, in the direction of the fixed blade, and as the guide-arm is carried farther through the keeper and the straight surfaces *c c'* are brought beneath the friction-roller by reason of the link-connection of the blade-arm 14 with the lever 20, the movable blade 13 is drawn downward, imparting a shearing cut as it closes over and upon the fixed blade.

In practice the shearing or movable blade 13 has no sliding motion until within about two and one-half inches of being closed, or until it reaches the hard portion of an ordinary horn, and from that time until the horn is completely severed the shearing-blade 13 has a sliding or shearing cut of about three inches in the full-sized implement.

Having thus described our invention, what we claim as new, and desire to secure by Letters Patent, is—

1. In a dehorning implement, the combination, with a body provided with a fixed blade at one extremity, a keeper, and a lever pivoted at or near the lower end, of a blade pivoted upon the said body, capable of moving upon the fixed blade when closed, and provided with an integral arm at the lower end, a curved guide-arm secured to the pivoted blade and blade-arm, said arm passing through the keeper upon the body, and a link connecting the extremity of the blade-arm and the lever, all combined for operation substantially as shown and described.

2. In a dehorning implement, the combination, with a body provided with a fixed blade at the upper end, a keeper, and a lever pivoted at or near the lower end, of a second blade pivoted upon the said body, adapted when closed to contact with the fixed blade, said pivoted blade having at its pivotal point a longitudinal slot and being provided with an arm integral with the lower end, a curved guide-arm integral with the pivoted blade and blade-arm, said arm passing through the keeper of the body and having straight surfaces $c$ and $c'$ and a circular surface $d$, and a link connecting the outer extremity of the blade-arm and the lever, substantially as described, whereby a shearing or sliding movement is imparted to the pivoted blade as it approaches the fixed blade, as set forth.

JOHN Z. BENSON.
ALBERT BLANCHARD.

Witnesses:
J. S. SMITH,
J. H. BLANCHARD.